Feb. 5, 1957 J. B. SINGEL 2,780,673
PHASING SYSTEM
Filed Sept. 15, 1950
Fig.I.
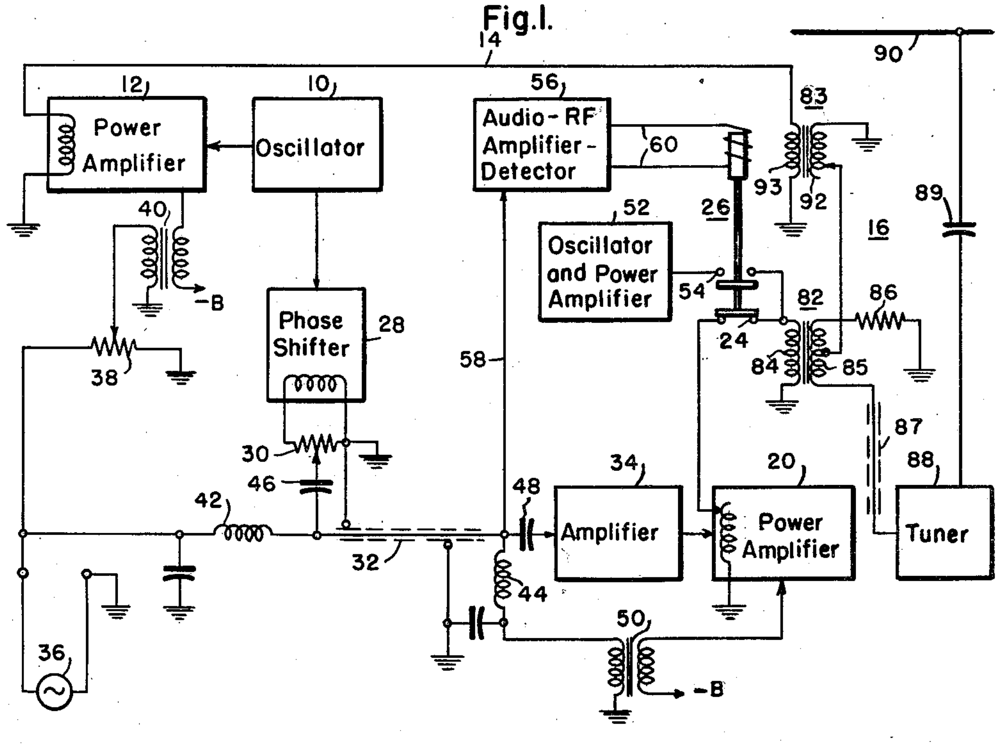
Fig.2.
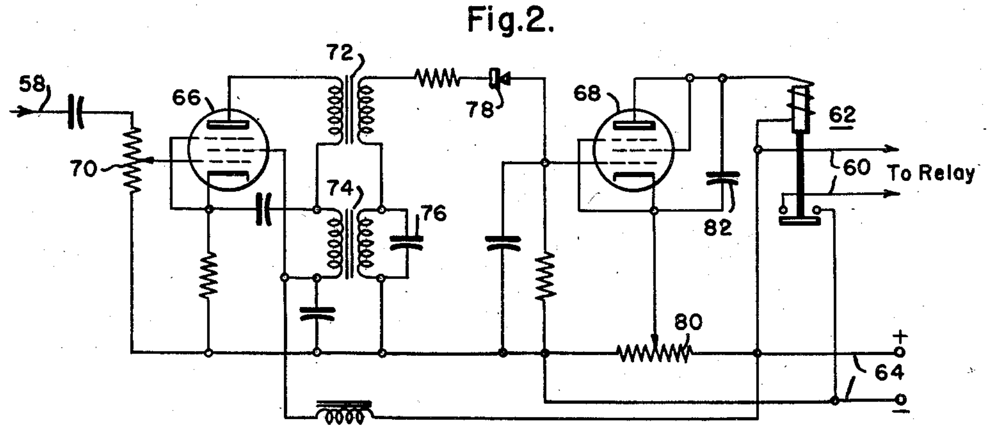
WITNESSES:
E. A. McCloskey
Wm. C. Groome
INVENTOR
John B. Singel.
BY F. E. Browder
ATTORNEY 2,780,673
Patented Feb. 5, 1957

2,780,673

PHASING SYSTEM

John B. Singel, Catonsville, Md., assignor to Westinghouse Electric Corporation, East Pittsburgh, Pa., a corporation of Pennsylvania Application September 15, 1950, Serial No. 185,043

8 Claims. (Cl. 179—15.5)

This invention relates to signalling systems, and particularly to improvements in communication systems of the type employing carrier waves to provide signalling and communication over physical conductors, for example over conductors which are also utilized for the transmission of high voltage, low frequency electrical energy for power purposes.

A principal object of the invention is to provide a carrier wave transmitting station having provision for generating carrier wave frequencies at two spaced locations, together with means for phasing the carrier wave outputs of said two generating locations.

Another object of the invention is to provide a transmitting station of the above type in which the effective output of either of the generating means will be maintained regardless of the production of carrier energy by the other generating means which is connected across the same output terminals.

Still another object of the invention is to provide a system of the above type in which the carrier wave energy is modulated by audio communication or signal frequencies, and in which the effective modulation output is maintained approximately constant whether both or only one of the carrier generators is in operation.

An additional object of the invention is to provide a carrier wave generating system in which the load or output system is supplied with carrier energy from a pair of power amplifiers which are excited from a single master oscillator, together with means operable upon failure of carrier signal from such oscillator for automatically supplying carrier power to that load from an alternative source, such as an additional master oscillator and power oscillator.

A further object of the invention is to provide a carrier generating system in which the load is supplied with carrier energy from a pair of power amplifiers having a common carrier frequency exciting source, and which provides a stand-by source of carrier power which will automatically be connected to the load upon failure of the exciting source to supply carrier frequency energy to one of said amplifiers, but only at such times as said amplifier also fails to receive audio modulating energy.

Accordingly, still another object of the invention is to provide an apparatus capable of sensing the presence or absence of both carrier frequency energy and audio frequency energy at a predetermined point in a network, and for maintaining a controlled circuit in one condition if either carrier energy or audio energy, or both, are present at that point, and in another condition if both carrier and audio energy are not present at that point.

The above and other objects and advantages of the invention will best be understood from the following detailed specification of a preferred and exemplary embodiment of the invention, taken in connection with the appended drawing, in which:

Fig. 1 is a schematic block diagram of a complete carrier transmitting phasing system showing the relationship of the stand-by carrier source to the remaining elements; and Fig. 2 is a detailed schematic diagram of the improved combined audio frequency and carrier frequency detector unit portion of Fig. 1.

Referring now particularly to Fig. 1 of the drawing, numeral 10 designates a carrier frequency master oscillator of any desired or well-known type adapted to generate a fixed carrier having a frequency lying at a desired point in the radio frequency range, for example, within the range from 50 to 150 kilocycles per second. The high frequency output of this oscillator is supplied to a power amplifier 12 and amplified therein to a value adequate for transmission over a conductor 14 to a load circuit 16.

The load circuit 16 includes a hybrid circuit comprising a pair of transformers 82 and 83. The primary 84 of the transformer 82 is connected between the relay contact 24 and ground. The secondary 85 of the transformer 82 is connected at its upper end to ground through a balancing resistor 86 and has its lower end connected through a 60 ohm transmission line 87, line tuner 88 and coupling condenser 89 to a power line 90, or other transmission medium. The center point of the secondary 85 of the transformer 82 is connected to the lower end of the secondary 92 of the transformer 83. The upper end of the secondary 92 is connected to ground. The lower end of the primary 93 of the transformer 83 is connected to ground and the upper end of the primary 93 is connected through conductor 14 to the power amplifier 12. The purpose of the resistor 86 is to balance the impedance of the coaxial line 87, the tuner 88, and whatever load is connected to the lower end of the winding 85.

At another location from oscillator 10 and amplifier 12, there is provided a second power amplifier 20 whose output is normally applied also to the load circuit 16 through the normally closed contacts 24 of a relay 26. The output frequency of this second amplifier is determined also by the master oscillator 10, a portion of the output of which is applied through a variable phase shifting device 28 to a voltage divider 30 and thence via a length of coaxial cable 32 to an auxiliary amplifier 34 which in turn drives the second power amplifier 20. The variable phase shifter 28 and the adjustable voltage divider 30 enable the voltage output of amplifier 20 to be adjusted to the same magnitude and phase as the output of amplifier 12, the amplifiers therefore being synchronized and operating in parallel into the common load circuit 16.

Power amplifiers 12 and 20 are preferably of the beam power output type or of equivalent type such as will present an impedance looking back into the oscillator 10 which is considerably higher than said load impedance. The fulfillment of this condition ensures that if the amplified carrier output from either of these sources should be interrupted, the loading effect of that transmitter upon the transmitter or amplifier remaining in operation will be negligible.

The output of amplifier 12 may be audio modulated in any suitable way, for example, from a source 36 of audio frequency voltage applied through a voltage divider 38 and a modulating transformer 40. As so far described, this modulating voltage will modulate the output of amplifier 12 only, and if the modulation voltage is adjusted so that the carrier is modulated 100% when amplifier 12 only is transmitting, then when an equal amount of unmodulated carrier from amplifier 20 is added to the load, the resulting modulation will be only about 50%. This condition would produce undesirable fluctuations in the audio output at the receiver station (not shown). To correct this condition, a small amount of the modulation voltage from source 36 is applied to the cable 32 through an inductance 42 and is retrieved at the far end of said cable through an inductance 44. Inductance 42 prevents the carrier frequency from voltage divider 30 from feeding into the source of audio modulations, and a condenser 46 in series with the output from divider 30 permits the carrier energy to pass into the cable but effectively isolates the phase shifter 23 and oscillator 10 from the audio voltage. Similarly, a condenser 48 at the opposite end of cable 32 blocks audio signals from the amplifiers 34 and 20, but passes the carrier frequency exciting voltage into these amplifiers.

The audio signal thus transmitted through inductor 44 then passes to a modulation transformer 50 for modulating the grids of power amplifier 20 sufficiently so that the percentage modulation of the carrier output does not vary substantially when the carrier output from amplifier 20 turned on and off. The variation in the carrier power level which occurs under these conditions is corrected by usual and well-known automatic volume control circuits in the receiver, which forms no part of the present invention.

From the above description, it is clear that master oscillator 10 is the sole source of carrier frequency energy in the system as so far described. In order to ensure a supply of carrier frequency to the load in the event of failure of the oscillator 10, there is provided a second source of carrier energy represented in Fig. 1 by the single block 52, and comprising an additional master oscillator and power amplifier whose output may be connected to load 16, 18 through the normally open contacts 54 of the relay 26. Upon operation of this relay, carrier power will be supplied from oscillator-amplifier 52, again in parallel with the output (now zero) of amplifier 12, but undesirable loading of the oscillator amplifier is again prevented by the high impedance of the output circuit of amplifier 12.

The operation hereinbefore explained can be used with either speech or tone modulation from source 36. However, in case amplifier 12 desires to speech modulate without modulating amplifier 20, and without amplifier 20 being capable of being modulated independently, then the carrier from 10 must not be applied to cable 32. This would trip relay 26 and connect oscillator and power amplifier 52 to the load. This is undesirable; hence, it is insufficient to provide for operation of relay 26 in response merely to the presence or absence of carrier at the righthand end of cable 32, because such carrier will be absent not only when oscillator 10 has failed but also when oscillator 10 is operating with speech modulation and the carrier supply to cable 32 has been cut off. However, this difficulty can be overcome by providing means for determining when carrier frequencies and audio frequencies are both absent from the output end of the cable.

Such a means is illustrated schematically in Fig. 1 as the audio-R. F. amplifier and detector 56, which has its input connected as by lead 58 to the output end of cable 32. This unit is capable of sensing both audio and carrier frequencies, and is arranged to control the relay 26 so as to throw oscillator-amplifier 52 across the load circuit 16, whenever both carrier and audio energy is absent from the cable, but to maintain source 52 disconnected when either carrier or audio energy, or both together, are supplied by the cable.

The detailed arrangement of a device suitable for this purpose is illustrated in Fig. 2 of the drawing, in which the input connection is again denominated by a lead 58, as in Fig. 1, and the voltage supplied to the relay 26 of Fig. 1 is provided over power conductors 60 controlled by a relay 62 which operates to connect a suitable source of direct current 64 to said power conductors 60. Source 64 is also utilized as the anode voltage supply for the vacuum tubes 66 and 68 and for the operation of the controlled or internal relay 62.

Unit 52 as illustrated in Fig. 2 comprises an amplifier stage and a bias detector. Either or both R. F. or audio voltage may be applied across the input potentiometer 70 to the control grid of amplifier tube 66, and the anode or space current of said tube passes in series through the primary windings of a pair of transformers 72 and 74, the former being an R. F. transformer and the latter being an audio frequency transformer. The secondary winding of audio transformer 74 is shunted by an R. F. by-pass condenser 76, and, of course, the secondary winding of transformer 72 has practically zero impedance at audio frequencies. Thus, since the secondary windings of both transformers are also connected in series, the input applied to tube 66, whether of low or high frequency, will appear across the combined output circuits of transformers 72 and 74, and are rectified as by a rectifier 78 to provide a control voltage for tube 68.

The cathode bias for tube 68 is adjusted by potentiometer 80 to such a value that when no signal of any kind is applied to tube 66, the anode current of tube 68 passing through relay 62 will maintain the same in operated condition to supply power to conductors 60 for operating the change-over relay 26 of Fig. 1. When either R. F. in the range from, say, 50 to 150 kilocycles, or audio signal in the range of say 300 to 3,000 cycles is applied to tube 66, the alternating current produced in the transformer secondaries is rectified at 78 and applied to the control grid of tube 68 to drive the same to non-conducting condition, so that relay 62 drops out and removes the power from conductors 60. Condenser 82 may be considered an R. F. by-pass for tube 68, but at the relatively low carrier frequencies considered herein it may be of sufficient value to operate also as a smoothing capacitor for the coil of relay 62.

It will be seen that I have provided apparatus and arrangements for fully satisfying the objects of my invention in a practical and efficient manner, but it is to be understood that many changes and modifications may be made in the details thereof without departing from the spirit of the invention as defined in the appended claims.

I claim as my invention:

1. In a carrier wave transmission system, a master oscillator, a first power amplifier connected to said oscillator, a second power amplifier, the output circuits of said amplifiers being connected to a common load, a transmission circuit extending from said oscillator to said second power amplifier, and means included in said transmission circuit for adjusting the phase and amplitude of the oscillating output of said second amplifier to match the oscillating output of said first amplifier.

2. The invention in accordance with claim 1, including means for modulating the output of said first amplifier, and means including at least a part of said transmission circuit for applying a portion of the output of said modulating means to said second amplifier to modulate the output thereof.

3. In a carrier wave system, an oscillator, a power amplifier, a transmission circuit connecting said oscillator to said amplifier, a source of modulation voltages connected to said transmission circuit, a load circuit normally connected to the output of said amplifier, a carrier energy source independent of said oscillator, selective means for disconnecting said amplifier from said load circuit and connecting the latter to said carrier energy source, and means responsive to carrier energy or to modulation energy or to a combination of the two in said transmission circuit for controlling the operation of said selective means.

4. In a carrier wave system, an oscillator, a power amplifier, a transmission circuit conducting carrier wave energy from said oscillator to said amplifier, a source of audio frequency energy, means connecting said source to said transmission circuit, an auxiliary carrier wave supply, a load circuit, relay means for alternatively connecting said amplifier and said auxiliary supply to said load circuit, and a bias detector connected to said transmission circuit and arranged to control said relay means in accordance with the presence of either audio frequency or carrier frequency energy in said transmission circuit.

5. In a carrier wave system, a load circuit, means for supplying carrier frequency energy and audio frequency energy to said load circuit, a secondary carrier source, and a bias detector for detecting audio frequency energy and carrier frequency energy and arranged to control the connection of said secondary carrier source to said load circuit upon detection of either audio or carrier frequency energy.

6. In a carrier wave transmission system, a first oscillator, a pair of amplifiers controlled from said oscillator, a transmission circuit connecting the oscillator to said amplifiers, a load circuit operatively connected to said amplifiers, a source of modulation voltages connected to said transmission circuit, a source of carrier wave energy independent of said first oscillator and including a second oscillator, a pair of transformers operatively connected to said first oscillator and having their respective primary and secondary windings connected in series, one of said transformers producing a voltage in its secondary winding in response to input voltages having the frequency of said first oscillator and the other of said transformers producing a voltage in its secondary winding in response to input voltages in the frequency range of said modulation voltages, means for detecting the output of the secondary windings of said transformers, and means controlled by said detecting means for connecting said independent carrier wave source to said load circuit upon failure of both the first oscillator and said source of modulation voltages.

7. In a carrier wave transmission system, a first oscillator, a pair of amplifiers controlled from said oscillator, a transmission circuit connecting the oscillator to said amplifiers, a load circuit operatively connected to said amplifiers, a source of modulation voltages connected to said transmission circuit, a source of carrier wave energy independent of said first oscillator and including a second oscillator, transformer means having its primary winding operatively connected to said first oscillator and to said source of modulation voltages, said transformer means being such that a voltage is produced in its secondary winding in response to input voltages having the frequency range of said first oscillator or the frequency range of said source of modulation voltages, and means responsive to a failure of voltage in the secondary of said transformer means for connecting said independent carrier wave source to said load circuit.

8. In a carrier wave transmission system, a master oscillator, a first power amplifier connected to said oscillator, a second power amplifier connected to said oscillator, the outputs of said amplifiers being connected to a common load, transmission circuits extending from said oscillator to said amplifiers, a source of modulation voltages connected to the transmission circuit associated with the second amplifier, means included in said second amplifier transmission circuit for adjusting the phase and amplitude of the oscillating output of the second amplifier to match the oscillating output of the first amplifier, a carrier energy source independent of said oscillator, selective means for disconnecting said amplifiers from said load circuit and connecting the latter to said carrier energy source, and means responsive to carrier energy or to modulation energy in said second amplifier transmission circuit for controlling the operation of said selective means.

References Cited in the file of this patent

UNITED STATES PATENTS

| | | |
|---|---|---|
| 1,608,566 | Potter | Nov. 30, 1926 |
| 2,021,321 | Miller | Nov. 19, 1935 |
| 2,207,906 | Weagant | July 16, 1940 |
| 2,270,771 | Schonfeld | Jan. 20, 1942 |
| 2,330,582 | Hepp | Sept. 28, 1943 |
| 2,357,439 | Usselman | Sept. 5, 1944 |
| 2,497,592 | Erickson | Feb. 14, 1950 |
| 2,535,446 | Mitchell | Dec. 26, 1950 |